March 4, 1969     A. DRITZ     3,430,346
SEWING GAUGE
Filed July 7, 1967
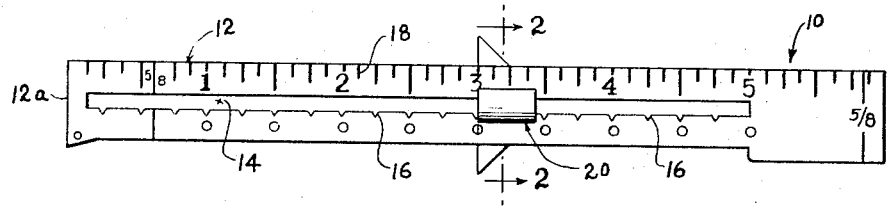
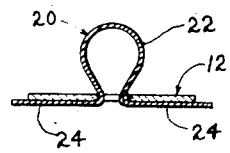
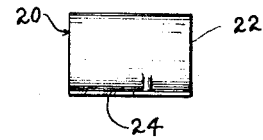
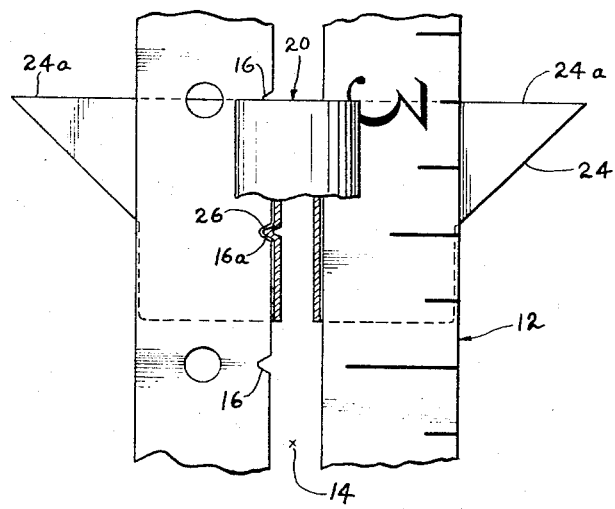
INVENTOR
Arthur Dritz
BY *Dalley Hoopes*
ATTORNEY

United States Patent Office 3,430,346
Patented Mar. 4, 1969

3,430,346
SEWING GAUGE
Arthur Dritz, Belle Harbor, N.Y., assignor to Scovill Manufacturing Company, Waterbury, Conn., a corporation of Connecticut
Filed July 7, 1967, Ser. No. 651,750
U.S. Cl. 33—2                                   1 Claim
Int. Cl. A41h 1/00

ABSTRACT OF THE DISCLOSURE

A sewing gauge in which the U-shaped slider indicator has an outward rib where it engages an edge of the gauge slot and the slot along that edge is formed with a series of spaced notches. The resilience of the bight of the indicator drives the rib into the notches to fix the position of the slider on the gauge at a selected notch.

---

This invention relates to a sewing gauge. More specifically, this invention relates to a sewing gauge in which the slider indicator member has positive means for assuring its positioning at a plurality of evenly spaced points.

In the sewing gauges of the prior art which have comprised a flat measuring element and a slider indicator, the slider indicator has slid along in a slot disposed along the center portion of the measuring element. Measuring indicia have been impressed on the surface of the measuring element. It has been difficult in the past for the user to set accurately the slider indicator at an exact spot along the measuring element. There has been difficulty in lining up the indicator with the measuring indicia desired and there has been a tendency for the slider indicator to wander from the desired point while the sewing gauge has been used.

It is an object of the present invention to provide positive means for indicating the positioning of the slider indicator at any one of a plurality of evenly spaced points along the measuring element.

At the same time, it is an object of the present invention to provide a sewing gauge having a simple and economic construction.

Further objects of the invention will be apparent from the reading of the following specification including the drawings wherein:

FIG. 1 is a front view of a sewing gauge embodying the invention;

FIG. 2 is a sectional view taken on line 2—2 of FIG. 1;

FIG. 3 is a side view of the slider indicator removed from the measuring element; and FIG. 4 is a greatly enlarged fragmentary front view showing the slider indicator partly in section.

Referring more specifically to the drawings, a sewing gauge embodying the invention is generally designated 10 in FIG. 1. It comprises an elongated measuring element 12 having an elongated slot 14 extending longitudinally thereof intermediate the side edges. One of the long edges of the slot has a plurality of notches 16 at evenly spaced points. In the version shown these points are at the ¼" marks on the indicia 18 of the measuring element.

The gauge further comprises a slider indicator 20 of resilient metal which has a U-shaped portion 22 (FIG. 2) and indicator arms 24, each terminating in a point.

In assembly the slider indicator has its U-shaped portion inverted and extending upwardly through the slot 14 in the measuring element. The resilient nature of the material of the slider indicator causes the ends of the U-shaped portion to press outward against the edges of the slot 14 in the plane of the slot. The indicator arms as shown extend out beyond the side edges of the measuring element and bear snugly upward against the under surface of the measuring element.

As shown, the slider indicator is sufficiently wide at its portions extending through the slot to resist any turning movement in the plane of the slot.

As shown best in FIG. 4, the slider indicator is formed with an outwardly projecting rib 26 (FIG. 4) in the plane of the measuring element.

In use, the slider indicator can be slid along the measuring element with the rib 26 successively snapping into the notches 16 and can be positioned where the rib engages inward of the notches as at 16a (FIG. 4) to indicate exactly the position of the slider indicator at one of the evenly spaced points. In the version shown this means that when the rib 26 engages in the notch 16a, the indicator arms 24 have their straight edges 24a at the "3 inch" position on the gauge. This means that the edges 24a are exactly 3 inches from the end 12a of the sewing gauge.

While I have shown the device of the invention in only one form, it is obvious that it can take a number of different forms.

What I claim is:

1. A sewing gauge comprising a flat elongated measuring element having an elongated slot extending longitudinally thereof intermediate the side edges, one of the long edges of the slot having a plurality of notches at evenly spaced points, and a slider-indicator of resilient material and being of U-shape having indicator arms extending outwardly from both ends of the U, the U portion of the slider-indicator being inverted and extending up through the slot in the measuring element with the arms of the U pressing resiliently outwardly against the opposite side edges of the slot respectively and the arms of the slider indicator extending outwardly against the flat undersurface of the measuring element with at least one of the arms extending beyond the side edges of the measuring element to comprise indicator means, the slider-indicator being sufficiently wide in its portions extending through the slot to resist any turning in the plane of the slot the slider-indicator having an outward rib in the plane of the measuring element and on the notched side of the slot whereby the resilience of the bight of the U drives the rib directly into the notches and, whereby the slider-indicator can be slid along the measuring element with the rib successively snapping into the notches and can be positioned where the rib engages in one of the notches to indicate exactly the positioning of the slider-indicator at one of the evenly spaced points.

References Cited

UNITED STATES PATENTS 1,700,857   2/1929   Schultz.
3,345,748  10/1967   Snyder _____ 33—2

WILLIAM D. MARTIN, JR., *Primary Examiner.*

U.S. Cl. X.R.
33—143